United States Patent
Takayama

(10) Patent No.: US 9,438,790 B2
(45) Date of Patent: Sep. 6, 2016

(54) IMAGE PROCESSING APPARATUS, IMAGE PROCESSING METHOD, AND IMAGING APPARATUS

(71) Applicant: PANASONIC CORPORATION, Osaka (JP)

(72) Inventor: Koji Takayama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 272 days.

(21) Appl. No.: 14/207,208

(22) Filed: Mar. 12, 2014

(65) Prior Publication Data

US 2014/0285674 A1    Sep. 25, 2014

(30) Foreign Application Priority Data

Mar. 19, 2013    (JP) .................................. 2013-056344
Feb. 6, 2014    (JP) .................................. 2014-020933

(51) Int. Cl.
*G06K 9/00*    (2006.01)
*H04N 5/232*    (2006.01)

(52) U.S. Cl.
CPC ................................ *H04N 5/23219* (2013.01)

(58) Field of Classification Search
None
See application file for complete search history.

(56) References Cited

U.S. PATENT DOCUMENTS

| 2006/0126941 A1* | 6/2006 | Higaki | G06K 9/00201 382/190 |
| 2009/0310860 A1* | 12/2009 | Ishikawa | G06T 5/009 382/167 |
| 2010/0053419 A1* | 3/2010 | Fukui | G06K 9/00234 348/352 |
| 2012/0294522 A1 | 11/2012 | Ueda et al. | |

FOREIGN PATENT DOCUMENTS

JP    2012-244337 A    12/2012

* cited by examiner

*Primary Examiner* — Kate Luo
(74) *Attorney, Agent, or Firm* — McDermott Will & Emery LLP

(57) ABSTRACT

The present technique has a face detection unit configured to detect a face region which is determined as a face in an image, a position specifying unit configured to specify a particular position in the image, a range specifying unit configured to set a hue range which has a first range containing a hue at a position specified by the position specifying unit in a case where the position specified by the position specifying unit is not contained in the face region and to set a hue range which has a second range containing a hue at a position specified by the position specifying unit and wider than the first range in a case where the position specified by the position specifying unit contains the face region, and image processing unit for performing image conversion processing based on color information contained in the hue range.

9 Claims, 6 Drawing Sheets

IMAGE PROCESSING APPARATUS, IMAGE PROCESSING METHOD, AND IMAGING APPARATUS

RELATED APPLICATIONS

This application claim the benefit of Japanese Application No. 2013-056344, filed on Mar. 19, 2013 and Japanese Application No. 2014-020933, filed Feb. 6, 2014, the disclosures of which Applications are incorporated by reference herein.

BACKGROUND OF THE INVENTION

1. Field of the Invention

The present technique relates to an image processing apparatus, an image processing method, and an imaging apparatus which are capable of providing various effects by performing color conversion processing on image data.

2. Description of the Related Art

Imaging apparatuses use image processing apparatuses configured to perform image processing in accordance with user preference on captured image. For example, there has been known an image processing apparatus configured to perform color conversion processing (hereinafter, also referred to as one-point color processing) for achromatizing colors other than a color in a user-specified-region (a color to be remained) on a through image (a live-view image) displayed on a display unit equipped with a touch panel function (for example, see Unexamined Japanese Patent Publication No. 2012-244337).

SUMMARY OF THE INVENTION

The imaging apparatus according to the present technique has a face detection unit configured to detect a face region which is determined as a face in an image, a position specifying unit configured to specify a particular position in the image in response to user operation, a range specifying unit configured to set a hue range which has a first range containing a hue at a specified position specified by the position specifying unit in a case where the position is not contained in the face region and to set a hue range which has a second range containing a hue at a specified position specified by the position specifying unit and wider than the first range in a case where the position specified by the position specifying unit contains the face region, and an image processing unit configured to perform image conversion processing based on color information contained in the hue range set by the range specifying unit.

DETAILED DESCRIPTION OF THE PREFERRED EMBODIMENT

Embodiments will be described below with reference to the drawings about an image processing apparatus, an image processing method, and an imaging apparatus according to the present technique. However, unnecessarily detailed description may be omitted. For example, detailed description of already known matters and repetition of substantially the same configuration may be omitted. Such omissions are for avoiding unnecessary redundancy in the following description to facilitate understanding by those skilled in the art.

The applicant provides the accompanying drawings and the following description for those skilled in the art to fully understand the present technique and does not intend to limit the subject described in the claims by the accompanying drawings and the following description.

1. Configuration

Figure 1:
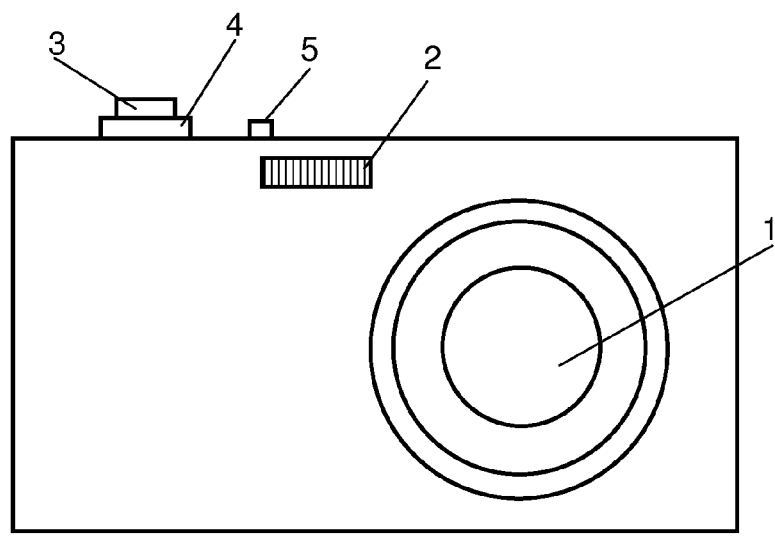
FIG. 1 is a plan view illustrating a front appearance of a digital camera as an example of an imaging apparatus equipped with an image processing apparatus according to an embodiment of the present technique.
Figure 2:
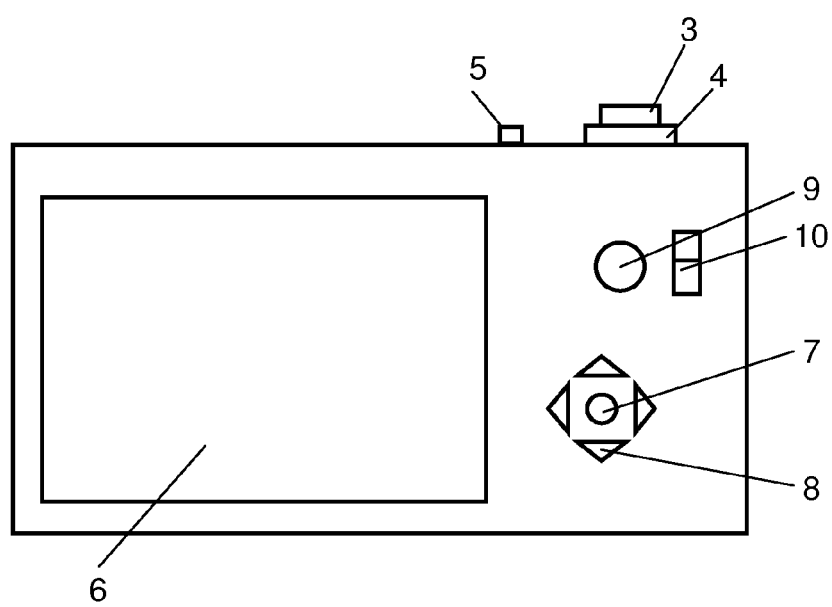
FIG. 2 is a plan view illustrating a back appearance of the digital camera.

FIG. 1 is a plan view illustrating a front appearance of a digital camera as an example of imaging apparatus equipped with an image processing apparatus according to an embodiment of the present technique. FIG. 2 is a plan view illustrating a back appearance of the digital camera.

A lens barrel accommodating optical system 1 and flash 2 are arranged on a front of a housing of the digital camera. On a top of the housing, an operation unit including still image release button 3, zoom lever 4, and power button 5 is arranged. On a back of the housing, liquid crystal monitor 6 which is a display unit equipped with a touch panel function for displaying a through image or a photographed image of a subject is arranged. Further, an operation unit including center button 7, directional button 8, moving image release button 9, and mode switch 10 is arranged on the back.

Figure 3:
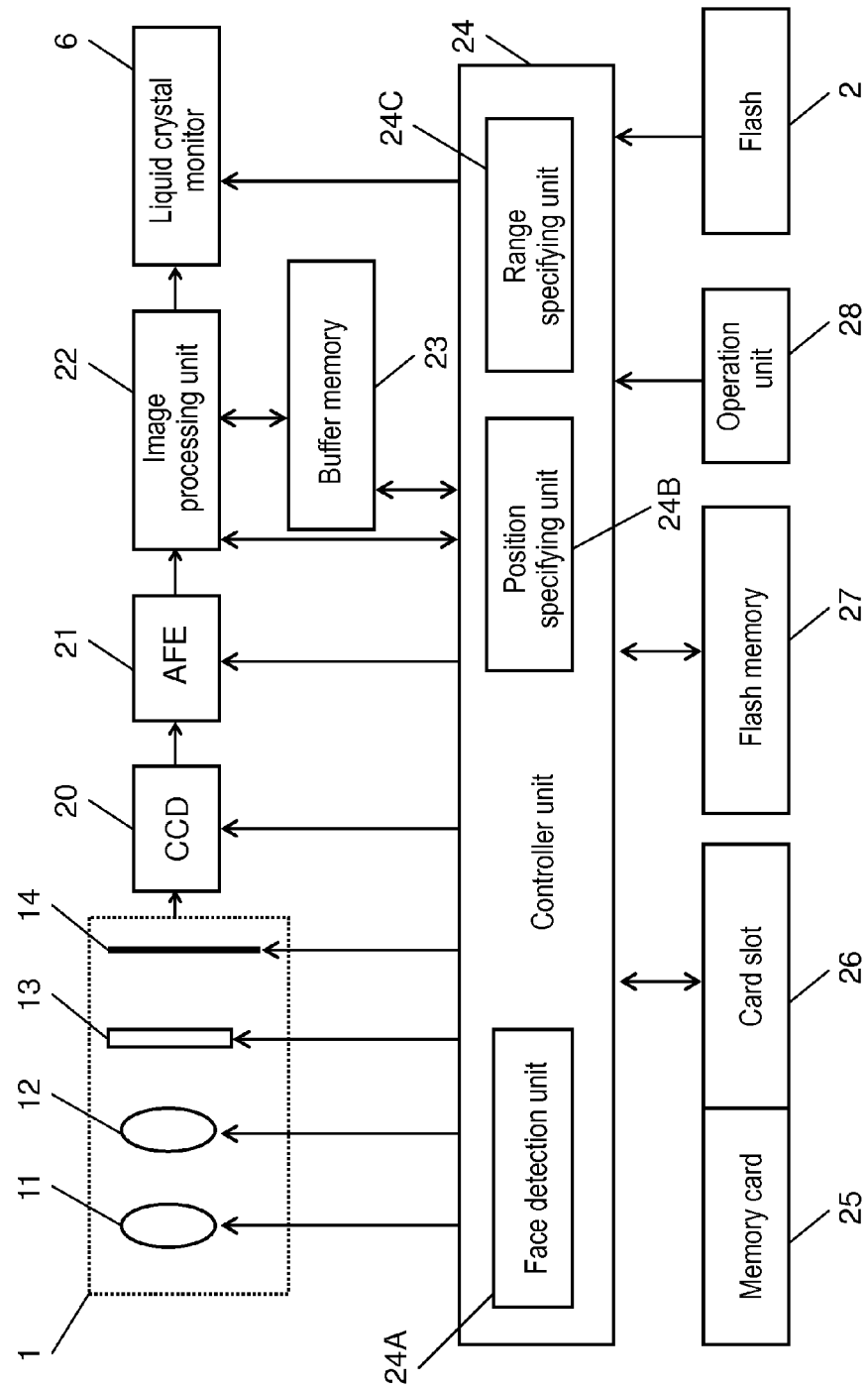
FIG. 3 is a block diagram illustrating a whole configuration of the digital camera as an example of the imaging apparatus equipped with the image processing apparatus according to the embodiment of the present technique.

FIG. 3 is a block diagram illustrating a whole configuration of the digital camera as an example of the imaging apparatus equipped with the image processing apparatus according to the embodiment of the present technique.

As illustrated in FIG. 3, the digital camera captures a subject image formed by optical system 1 by using CCD (Charge Coupled Devices) image sensor 20 which is an imaging unit. CCD image sensor 20 generates image data based on the captured subject image. The image data generated by CCD image sensor 20 is sent through AFE (Analog Front End) 21 which is a signal conditioning circuit for adjusting an analog signal to image processing unit 22 which is for performing such processing as image conversion and is subjected to respective types of image processing. The generated image data is recorded on a data recording unit such as a built-in recording medium or a removable external recording medium. The recording medium may be a flash memory, a memory card, or the like, and it is assumed to be a memory card in the present embodiment.

CCD image sensor 20 captures the subject image formed through optical system 1 and generates the image data. When the digital camera is in a photographing mode, CCD image sensor 20 can generate a new frame of image data for every certain time period.

In AFE 21, noise suppression by correlated double sampling, amplification to an input range width of an A/D converter by an analog gain controller unit, and A/D conversion by the A/D convertor are performed on the image data read out from CCD image sensor 20. Subsequently, AFE 21 outputs the image data to image processing unit 22.

Image processing unit 22 performs various types of image processing on the image data output from AFE 21. The various types of image processing include smear correction, white balance correction, gamma correction, YC conversion processing, electronic zoom processing, compression processing, and expansion processing. The image processing is not limited to those types of processing. Image processing unit 22 temporarily stores the image information subjected to the various types of image processing in buffer memory 23. Image processing unit 22 performs color conversion processing including one-point color processing on the image data stored in buffer memory 23. The image data after the color conversion processing is stored in buffer memory 23. Details of the one-point color processing will be described later. Meanwhile, buffer memory 23 is a storing means functioning as a work memory for image processing unit 22 or for controller unit 24 and can be implemented by a DRAM (Dynamic Random Access Memory) or the like.

Controller unit 24 is for controlling the operation of the whole digital camera and is implemented by a microcomputer which has a ROM (Read Only Memory) for storing programs, a CPU (Central Processing Unit) for processing various types of information by executing the programs, and the like. The ROM stores programs for collectively controlling the operation of the whole digital camera including file control, autofocus control (AF control), automatic exposure control (AE control), and emission control for flash 2. Controller unit 24 serves as face detection unit 24A, position specifying unit 24B, and range specifying unit 24C by executing the programs stored in the ROM.

Face detection unit 24A detects a region determined as a person's face from the image data stored in buffer memory 23 to take the region as a face region and stores information of the face region in buffer memory 23. Various publicly known techniques can be used as a method for detecting a region which is a person's face from the image data.

Position specifying unit 24B pinpoints a position or a region in the image based on user operation and stores it in buffer memory 23 as the position or the region of a "color desired to be remained".

Range specifying unit 24C determines a range for calculating an evaluation value and a width of the hue based on the position or the region of a "color desired to be remained" pinpointed by position specifying unit 24B and the face detection result from face detection unit 24A. Then, range specifying unit 24C determines the range of the color desired to be remained as a hue range based on the range for calculating an evaluation value and the width of the hue. The range for calculating an evaluation value and the width of the hue will be described in detail later.

Memory card 25 for recording the image data can be attached to/detached from card slot 26 connected to controller unit 24 by the user so that it is electrically and mechanically connected to controller unit 24. Card slot 26 may be provided with a function of controlling memory card 25. Memory card 25 is an external memory that contains a recording unit such as a flash memory. Memory card 25 records data such as image data to be processed in image processing unit 22. The high pixel count image data to be recorded on memory card 25 is generated by image processing unit 22 based on the image data generated by CCD image sensor 20 after detection of user operation on the release button. Controller unit 24 records on memory card 25 the image data processed in image processing unit 22 and stored in buffer memory 23. The image data recorded on memory card 25 is displayed on liquid crystal monitor 6 based on user operation.

Flash memory 27 connected to controller unit 24 functions as an internal memory for recording the image data and setup information of the digital camera. Although flash memory 27 is illustrated to be external to controller unit 24 in FIG. 3, it is needless to say that flash memory 27 may be contained in controller unit 24.

Optical system 1 includes focus lens 11, zoom lens 12, diaphragm 13, and shutter 14. Focus lens 11 is used for adjusting a focusing state of the subject. Zoom lens 12 is used for adjusting an angle of view of the subject. Diaphragm 13 is used for adjusting a light quantity incident on CCD image sensor 20. Shutter 14 adjusts an exposure time of light incident on CCD image sensor 20. Focus lens 11, zoom lens 12, diaphragm 13, and shutter 14 are driven by respectively corresponding driving means such as a DC motor and a stepping motor according to control signals sent from controller unit 24. Although not illustrated in the drawings, optical system 1 may include an Optical Image Stabilizer (OIS) lens. The respective types of lens included in optical system 1 can be implemented by a plurality of lenses or a plurality of lens groups.

Liquid crystal monitor 6 displays an image based on the image data processed by image processing unit 22. Liquid crystal monitor 6 displays the images such as the through image and the recorded image. The through image is an image successively displaying a new frame of image data which is generated by CCD image sensor 20 for each certain time period. In general, when the digital camera is in the photographing mode, image processing unit 22 generates the through image based on the image data generated by CCD image sensor 20. With the through image displayed on liquid crystal monitor 6 for reference, the user can take a photograph while confirming the composition of the subject. The recorded image is made as a result of reducing the high pixel count image data recorded on memory card 25 to low pixel count image data during a playback mode of the digital camera.

Operation unit 28 connected to controller unit 24 is for detecting user operation and collectively refers to operation buttons and switch of the digital camera described with reference to FIG. 1 and FIG. 2 and a touch panel installed in liquid crystal monitor 6. When operation unit 28 detects user operation, it sends respective operation instructing signals to controller unit 24. Examples of operation of operation unit 28 will be described below.

Still image release button 3 is a two-stage push button which allows a half-press operation and a full-press operation. When still image release button 3 is half-pressed by the user, controller unit 24 performs AF (Auto Focus) control or AE (Auto Exposure) control to determine photographing conditions. Subsequently, when still image release button 3 is full-pressed by the user, controller unit 24 performs photographing processing. Controller unit 24 records the image data captured at a moment of the full-press operation onto memory card 25 or the like as a still image. Unless otherwise stated, the expression "to press still image release button 3" is assumed to be corresponding to "to full-press".

Moving image release button 9 is a push button for instructing start/finish of moving image recording. When moving image release button 9 is pressed by the user, controller unit 24 records the image data generated by image processing unit 22 based on the image data generated by CCD image sensor 20 onto a recording medium such as memory card 25 successively as a moving image. When moving image release button 9 is pressed again, the recording of the moving image finishes.

Zoom lever 4 is for adjusting the angle of view between a wide-angle end and a telephoto end inclusive. Zoom lever 4 is implemented by a lever which automatically returns to a middle position. When zoom lever 4 is operated by the user, it sends an operation instructing signal for driving zoom lens 12 to controller unit 24. In other words, when zoom lever 4 is set to the wide-angle end, controller unit 24 drives zoom lens 12 to capture a wide-angle shot of the subject. Conversely, when zoom lever 4 is set to the telephoto end, controller unit 24 drives zoom lens 12 to capture a telephoto shot of the subject.

Power button 5 is a push button for the user to instruct the digital camera to supply power to the respective components of the digital camera. When power button 5 is pressed by the user in the power OFF state, controller unit 24 supplies power to the respective components of the digital camera to activate them. When power button 5 is pressed by the user in the power ON state, controller unit 24 operates to stop supplying power to the respective components.

Center button 7 is a push button. When center button 7 is pressed by the user while the digital camera is in the photographing mode or the playback mode, controller unit 24 displays a menu screen on liquid crystal monitor 6. The menu screen is for the user to set respective conditions for photography operation/playback operation. The information set on the menu screen is recorded on flash memory 27. In the case where the respective conditional setting items have been selected and center button 7 is pressed, center button 7 functions as a button for deciding on the set conditions.

Directional button 8 is a push button which can be pressed in upward/downward/leftward/rightward directions. By pressing directional button 8 in any one of the directions, the user can select one of the respective conditional items displayed on liquid crystal monitor 6.

Mode switch 10 is a button which can be pressed in upward/downward directions. By pressing mode switch 10 in either direction, the user can switch the state of the digital camera to the photographing mode or the playback mode.

Image processing unit 22 and controller unit 24 may be implemented by hardwired electronic circuits or may be implemented by a microcomputer or the like which is operated according to programs. Alternatively, image processing unit 22 and controller unit 24 may be formed together on a single semiconductor chip. The ROM needs not to be provided inside controller unit 24 and may be provided outside of controller unit 24 as an external memory.

An imaging device constituting the imaging unit is not limited to the CCD image sensor and may be another sensor such as a CMOS (Complementary Metal-Oxide Semiconductor) image sensor. Further, an imaging unit formed of an optical system, an image sensor, and the like may be implemented by a camera module which has lenses, a CMOS image sensor, part of signal processing circuit unit, and the like integrated into a module.

2. Operation

Operation of the digital camera including operation of the image processing apparatus according to the embodiment of the present technique will be described below.

The image processing apparatus in the digital camera of the embodiment can perform the one-point color processing on captured image data. The digital camera displays the image data, and based on the user-specified position of a color desired to be remained and the face detection result, determines a range for calculating an evaluation value and a hue width. Then, the digital camera can determine the color to be remained based on the determined range for calculating an evaluation value and the determined hue width and perform color conversion processing for achromatizing colors other than the color to be remained.

[2-1. Photography Operation of the Digital Camera]

Figure 4:
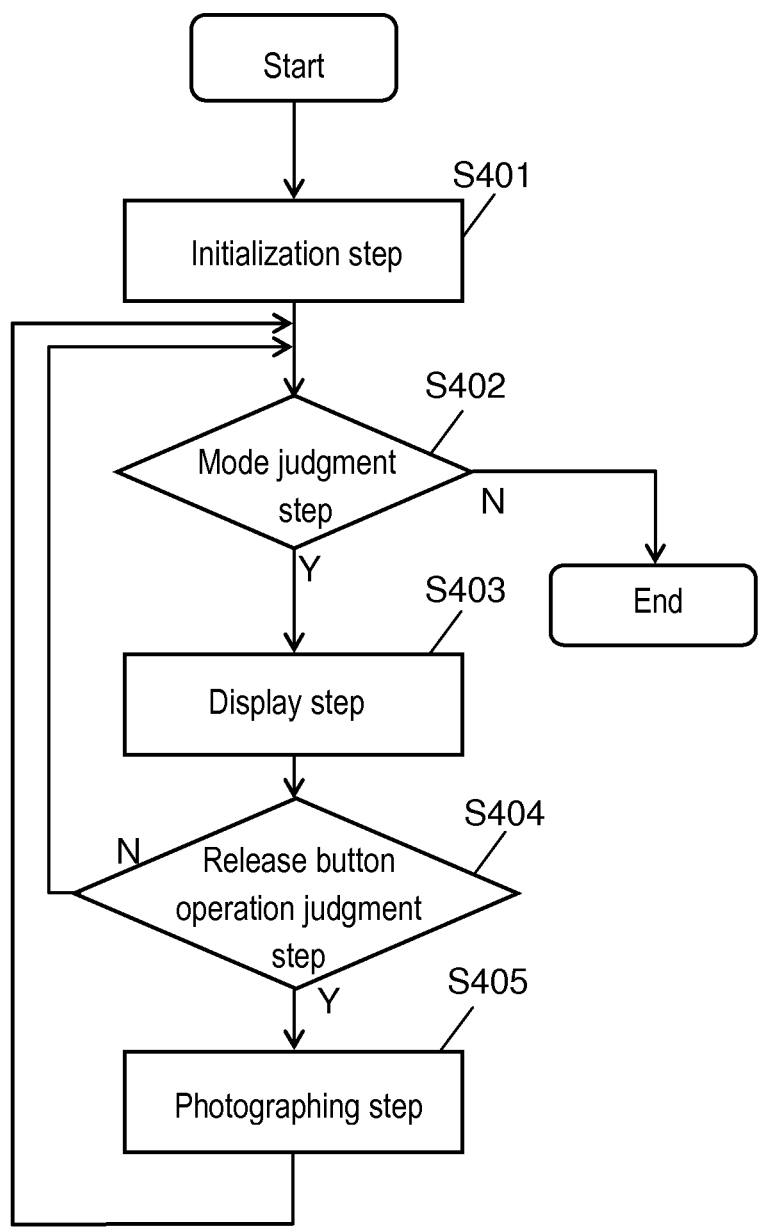
FIG. 4 is a flow chart for describing control of the digital camera in a photographing mode.

First, the photography operation of the digital camera will be described. FIG. 4 is a flow chart for describing control of the digital camera in the photographing mode. The digital camera takes a moving image and a still image in the photographing mode. Here, the photography operation of a still image will be described.

When the digital camera enters the photographing mode in response to user operation performed on mode switch 10, controller unit 24 performs initialization step S401 for initialization processing necessary to record a still image.

Next, in mode judgment step S402, controller unit 24 checks the operated state of mode switch 10, and in the case where it determines that the switch is set to the photographing mode (Y), it performs display processing of display step S403 for displaying a through image on liquid crystal monitor 6 according to current set values. Then, in release button operation judgment step S404, controller unit 24 checks the operated state of still image release button 3, and in the case where it determines that still image release button 3 is pressed and it is commanded to perform the photography operation (Y), it performs processing of photographing step S405 for photographing a still image. Specifically, controller unit 24 records image data of a still image which has been generated by image processing unit 22 based on image data generated by CCD image sensor 20 onto a recording medium such as memory card 25 at the moment when still image release button 3 is pressed.

After performing the processing of still image photographing operation of photographing step S405, controller unit 24 repeatedly performs the processing from mode judgment step S402.

On the other hand, in the case where controller unit 24 determines that the state of mode switch 10 is not the photographing mode (N) in mode judgment step S402, it finishes the processing without performing operation of next display step S403. In the case where controller unit 24 has not detected depression of still image release button 3, i.e., in the case where controller unit 24 determines that it is not commanded to perform the photography operation (N) in release button operation judgment step S404, it repeatedly performs processing from mode judgment step S402.

[2-2. Operation of the One-Point Color Processing]

Now, operation of the one-point color processing in the image processing apparatus of the digital camera according to the present technique will be described.

Figure 5:
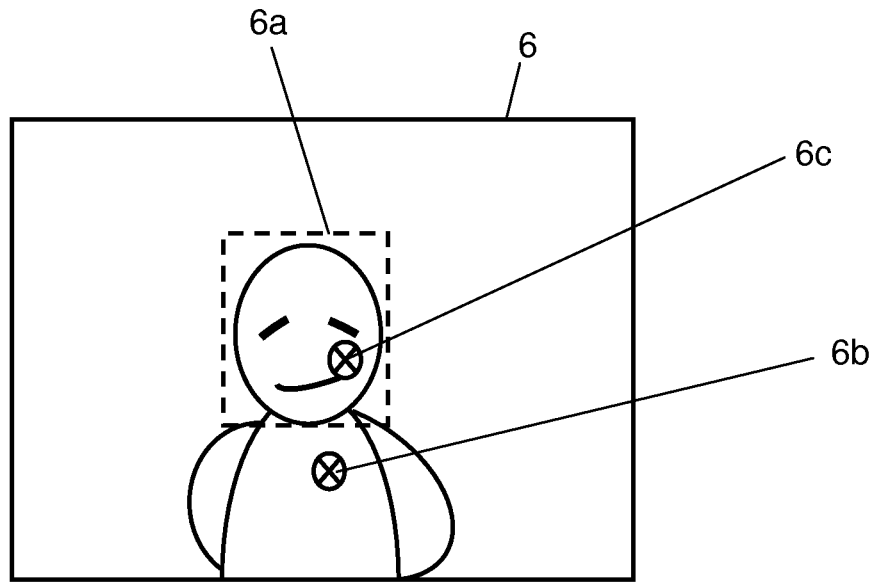
FIG. 5 is an illustration for describing an exemplary state of image displayed on a liquid crystal monitor in a one-point color processing mode in the image processing apparatus of the digital camera according to the present technique.
Figure 6:
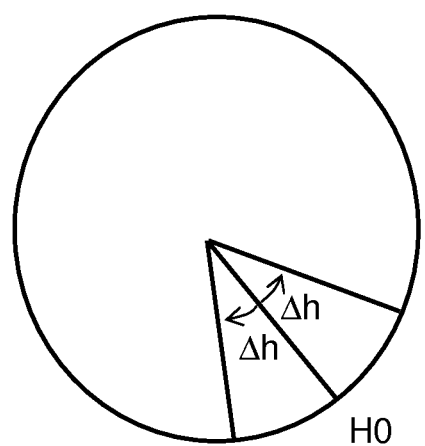
FIG. 6 is an illustration for describing processing on a hue range in a case where a user has specified a position out of a face region of the image as a position of a color desired to be remained in FIG. 5.
Figure 7A:
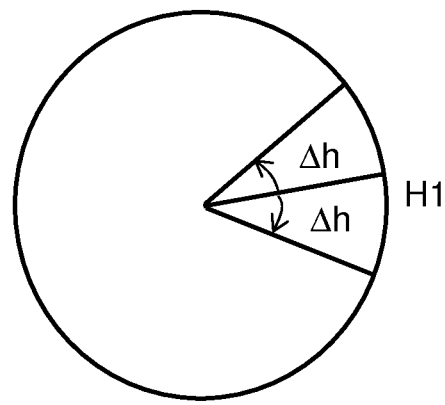
FIG. 7A and FIG. 7B are illustrations for describing processing on a hue range in a case where the user has specified a face region of the image as a position of a color desired to be remained in FIG. 5.
Figure 7B:
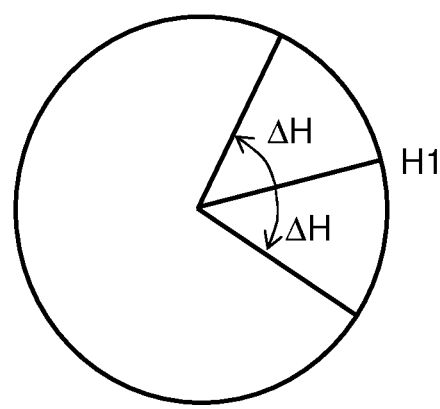

FIG. 5 is an illustration for describing an exemplary state of image displayed on the liquid crystal monitor in the one-point color processing mode in the image processing apparatus of the digital camera according to the present technique. FIG. 6 is an illustration for describing processing on the hue range in the case where the user has specified a position out of a face region of the image as a position of a color desired to be remained in FIG. 5. FIG. 7A and FIG. 7B are illustrations for describing processing on the hue range in the case where the user has specified the face region of the image as a position of a color desired to be remained in FIG. 5.

As illustrated in FIG. 5, in the image processing apparatus of the digital camera according to the present technique, face detection unit 24A of controller unit 24 detects face region 6a which is determined as a face in the image. Then, position specifying unit 24B specifies a particular position in the image, for example, a particular position which has a color desired to be remained, based on the user operation.

In the case where range specifying unit 24C determines that position 6b specified by position specifying unit 24B is not contained in face region 6a, it sets a default first range (H0±Δh) containing hue H0 present at position 6b specified by position specifying unit 24B as the hue range of a color desired to be remained as illustrated in FIG. 6.

On the other hand, in the case where range specifying unit 24C determines that position 6c specified by position specifying unit 24B is contained in face region 6a, it sets a hue range which has a second range (H1±ΔH) containing hue H1 present at position 6c specified by position specifying unit 24B and wider than the default first range (H1±Δh) as illustrated in FIG. 7A and FIG. 7B. Since relationship between Δh and ΔH indicating hue ranges is Δh<ΔH in FIG. 7A and FIG. 7B, in the case where position 6c specified by position specifying unit 24B is contained in face region 6a, range specifying unit 24C sets the hue range which has the second range (H1±ΔH) wider than the default first range (H1±Δh) as illustrated in FIG. 7A and FIG. 7B as the hue range of a color desired to be remained.

Although the first range (H1±Δh) is described as the default range in the description of FIG. 7A and FIG. 7B, it is needless to say that the second range (H1±ΔH) may be set as the default range. Further, since relationship between the first range and the second range only needs to be that the second range has a wider hue range than the first range does, the image processing apparatus may be configured to have a plurality of pairs of the first range and the second range in the relationship set in advance for the user to select one from the plurality of pairs of set values.

Further, hue widths Δh and ΔH need not to be added to the both sides of hues H0 and H1 present at positions specified by position specifying unit 24B respectively to make the hue ranges of the first range and the second range, and the first range and the second range only need to contain hues H0 and H1 present at the specified positions respectively. For example, in FIG. 7A and FIG. 7B, the first range may be a range with different widths +Δhx and −Δhy added to hue H1 and the second range may be a range with different widths +ΔHx and −ΔHy added to hue H1. Also in that case, the relationship between the first range and the second range only needs to satisfy the requirement that the hue width made by +ΔHx and −ΔHy is wider than the hue width made by +Δhx and −Δhy.

Image processing unit 22 performs image conversion processing based on color information contained in the hue range set by range specifying unit 24C of controller unit 24.

As described above, in the image processing apparatus of the digital camera according to the present technique, the hue range of a color to be remained is set wider in the case where the position of a color desired to be remained is contained in the face region than in the case where the position is not contained in the face region. As a result, in the case where the user has specified the face of a person with the intention of making the color of the whole face of the person remained, the hue range of the color at the specified position, i.e., the skin color is set rather wide. Therefore, all of various hues of the skin color contained in the person's face, for example, from a bright hue at the position where the face is lit to a dark hue at the position where the face is shaded from the light are highly possible to be contained in the color to be remained. Consequently, one-point color processing for making the color of the whole face of a person remained and achromatizing the other colors becomes available, therefore, one-point color processing nearer to the user's intention becomes available.

Figure 8:
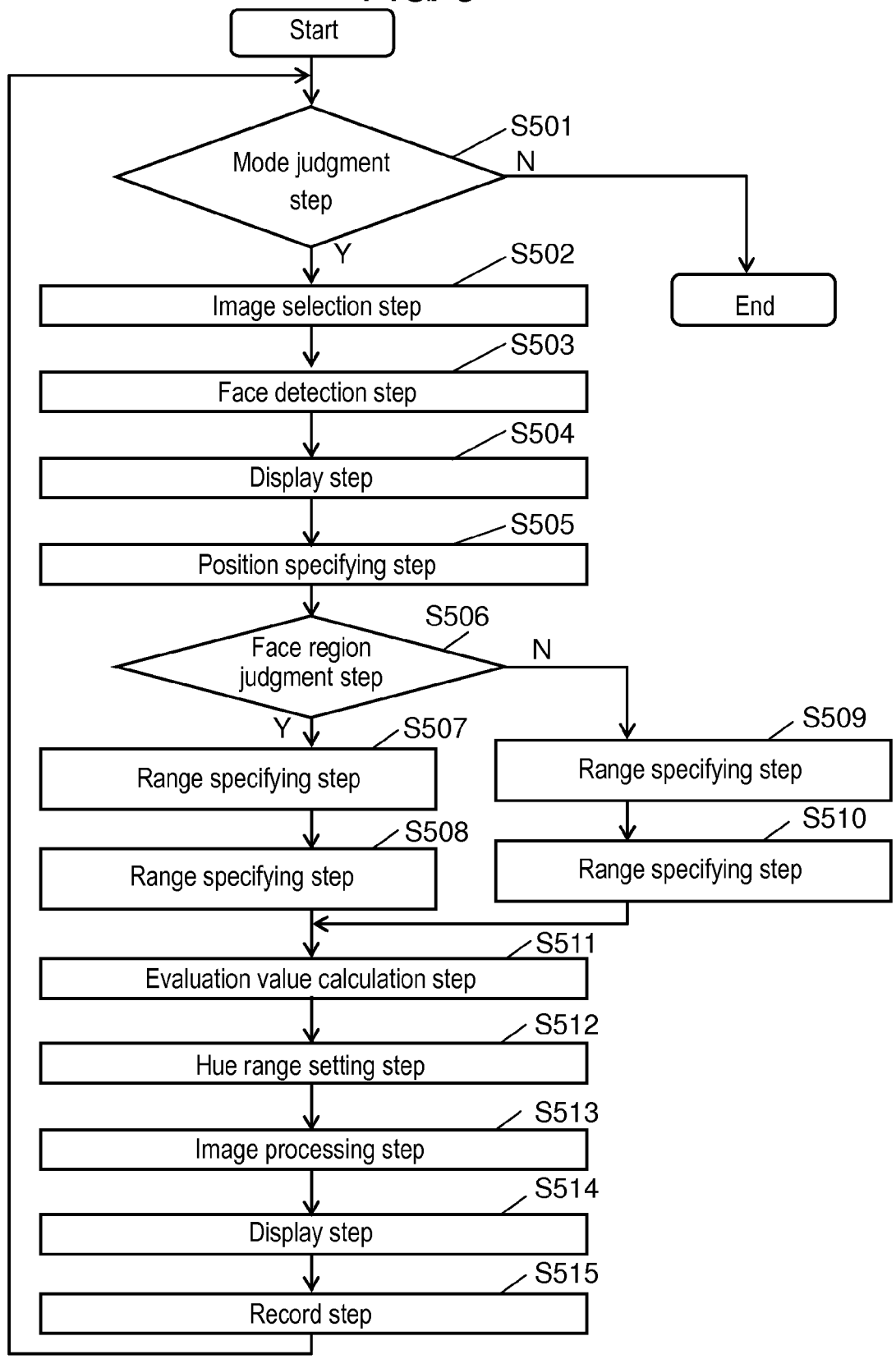
FIG. 8 is a flow chart for describing an example of control of one-point color processing in the one-point color processing mode in the image processing apparatus of the digital camera according to the embodiment of the present technique.

FIG. 8 is a flow chart for describing an example of control of the one-point color processing in the one-point color mode in the image processing apparatus of the digital camera according to the embodiment of the present technique.

As illustrated in FIG. 8, first, controller unit 24 determines whether the current mode is the one-point color mode or not in mode judgment step S501, and in the case where it determines that the current mode is the one-point color mode (Y), the processing proceeds to the next step, image selection step S502 for selecting an image. In the case where controller unit 24 determines that the current mode is not the one-point color mode (N) in mode judgment step S501, it finishes the processing in the one-point color mode.

In image selection step S502, controller unit 24 prompts the user to select image data to be subjected to the one-point color processing. Specifically, controller unit 24 causes liquid crystal monitor 6 to display a list of image data recorded on memory card 25. Then, according to an operation performed by the user on operation unit 28, controller unit 24 selects a piece of image data from the list.

Next, in face detection step S503, face detection unit 24A detects a face region in the selected image data. In the case where the image data contains a region which can be determined as a face of a person, the region is stored in buffer memory 23 as a set of a center position, a length and a width of the region. Then, controller unit 24 performs display step S504 for displaying an image based on the image data on liquid crystal monitor 6. On that occasion, controller unit 24 causes a frame enclosing face region 6a to be superimposed on the image displayed on liquid crystal monitor 6 as illustrated in FIG. 5. Meanwhile, the frame enclosing face region 6a is not limited to be square as illustrated in FIG. 5 and, further, does not need to be displayed.

Subsequently, position specifying unit 24B performs position specifying step S505 for prompting the user to select a position in the image for the user to decide on a color desired to be remained. Specifically, when the user operates directional buttons 8 or the like while liquid crystal monitor 6 is displaying the image, position specifying unit 24B moves a cursor on the image based on the user operation. In the case where the user presses center button 7 when the cursor has moved to a desired position, position specifying unit 24B stores the position of the cursor at the moment in buffer memory 23 as the position of a color desired to be remained. As another example, the image processing apparatus may be configured to have a touch panel function added to liquid crystal monitor 6 so that the user selects the position by directly touching the screen of liquid crystal monitor 6.

Next, range specifying unit 24C performs face region judgment step S506 for judging whether the position of a color desired to be remained acquired in position specifying step S505 is in the face region detected in face detection step S503. In the case where range specifying unit 24C determines that the position of a color desired to be remained acquired in position specifying step S505 is in the face region (Y), it sets the range for calculating the evaluation value smaller than a default value (standard) in range specifying step S507. Further, in range specifying step S508, range specifying unit 24C sets the hue range wider than the default range as described above.

On the other hand, in the case where range specifying unit 24C determines that the position of a color desired to be remained acquired in position specifying step S505 is not in the face region (N), it sets the range for calculating the evaluation value to the default value (standard) in range specifying step S509. Further, in range specifying step S510, range specifying unit 24C sets the hue range of the color desired to be remained to the default first range as described above.

Now, the range for calculating the evaluation value will be described. In finally determining the hue range of the color desired to be remained, the hue which would come to the center (median value) of the hue range is determined as the evaluation value. The evaluation value can be calculated as a mean value of hues of surrounding pixels in a particular region around the user-specified position. The particular region on that occasion is the range for calculating the evaluation value. Specifically, in the case where the range for calculating the evaluation value is rectangular, the range for calculating the evaluation value is set to satisfy expressions $X1<X0$ and $Y1<Y0$, where $X0$ is the width and $Y0$ is the height of a default standard range for calculating the evaluation value and $X1$ is the width and $Y1$ is the height of the range in the case where it is determined that the position of a color desired to be remained is in the face region. The hue range indicates a color to be remained in the form of a hue range of the color as a range from the evaluation value around the hue indicated by the evaluation value.

Next, range specifying unit 24C calculates the evaluation value in evaluation value calculation step S511. Specifically, range specifying unit 24C calculates a mean value of hues of pixels in a range for calculating the evaluation value which has been set in range specifying step S507 or S509 around the position of a color desired to be remained selected in position specifying step S505, and takes the mean value as the evaluation value.

Next, range specifying unit 24C determines the hue range as described above in hue range setting step S512.

Next, controller unit 24 performs the color conversion processing in image processing step S513. Specifically, controller unit 24 performs the color conversion processing by controlling image processing unit 22. Image processing unit 22 takes color information contained in the hue range at the position specified by position specifying unit 24B (the hue range determined in hue range setting step S512) as standard color information and performs the image conversion processing for changing color information of a particular region of the image wherein the particular region of the image has color information which is not contained in the standard color information. In the case of the one-point color processing, image processing unit 22 performs the image conversion processing for achromatizing a particular region of the image wherein the particular region of the image has color information which is not contained in the standard color information.

The color conversion processing is not performed on pixels which have hues within the hue range. Then, image processing unit 22 performs display step S514 for displaying the image which has been subjected to the color conversion processing in image processing step S513 on liquid crystal monitor 6. Finally, image processing unit 22 performs record step S515 for recording the image data which has been subjected to the one-point color processing on flash memory 27.

In the above embodiment, although a case of one-point color processing for achromatizing a particular region in the image has been described as an example of image conversion for changing color information of a particular region of the image wherein the particular region of the image has color information which is not contained in the standard color information, the image conversion may be processing for converting the color information into a chromatic color such as sepia. Further, image conversion for changing brightness or contrast of an image may be performed on the position specified by position specifying unit 24B. Moreover, in converting the color information of a particular region which has color information different from the standard color information, the processing for converting the color information may be performed also on the position specified by position specifying unit 24B on the condition that the color information is converted into color information other than the color information of the particular region.

3. Summarization

The digital camera which has the image processing apparatus according to the present technique has an imaging unit for capturing a subject image, a data recording unit for recording image data generated on the basis of the subject image captured by the imaging unit, a display unit for displaying an image based on the image data recorded in the data recording unit, and an image processing apparatus configured to perform image processing on the image displayed on the display unit.

The image processing apparatus has controller unit 24 configured to set a hue range which has a first range containing a hue at a position specified by user operation in a case where a particular position in the image specified by user operation is not contained in the face region of the image and to set a hue range which has a second range containing a hue at a position specified by user operation and wider than the first range in a case where the specified particular position in the image specified by user operation contains the face region.

Controller unit 24 has face detection unit 24A configured to detect a face region which is determined as a face in an image, position specifying unit 24B configured to specify a particular position in the image in response to user operation, and range specifying unit 24C configured to set a hue range which has a first range containing a hue at a position specified by position specifying unit 24B in a case where the position specified by position specifying unit 24B is not contained in the face region and to set a hue range which has a second range containing a hue at a position specified by position specifying unit 24B and wider than the first range in a case where the position specified by position specifying unit 24B contains the face region. Image processing unit 22 of the image processing apparatus performs image conversion processing based on color information contained in the hue range set by range specifying unit 24C of controller unit 24.

With that configuration, the hue range of a color to be remained is set wider in the case where the position of a color desired to be remained is contained in the face region than in the case where the position is not contained in the face region. As a result, in the case where the user has specified the face of a person with the intention of making the color of the whole face of the person remained, the hue range of the color at the specified position, i.e., the skin color is set rather wide. Therefore, all of various hues of the skin color contained in the person's face, for example, from a bright hue at the position where the face is lit to a dark hue at the position where the face is shaded from the light are highly possible to be contained in the color to be remained. Consequently, one-point color processing for making the color of the whole face of a person remained and achromatizing the other colors becomes available, therefore, one-point color processing nearer to the user's intention becomes available.

4. Other Embodiments

The present technique is not limited to the above described embodiment. Other embodiments of the present technique will be described below.

In the embodiment described in FIG. 8, range specifying unit 24C is configured to set both of the range for calculating an evaluation value and the width of a hue based on whether the position of a color desired to be remained is contained in the face region or not and to set the hue range of the color desired to be remained based on both of the range for calculating an evaluation value and the width of a hue. However, the range for calculating an evaluation value may be a fixed default range set by the user or the apparatus without regard to whether the position of a color desired to be remained is contained in the face region or not.

Further, in the embodiment described in FIG. 8, range specifying unit 24C is configured to determine the median value of a hue range of a color desired to be remained by setting the range for calculating an evaluation value and also to determine the hue range of a color desired to be remained by setting the width of a hue. However, range specifying unit 24C may be configured to determine an evaluation value of a hue desired to be remained based on the user-specified position of a color desired to be remained and to determine the hue range desired to be remained by reading out appropriate data from a table based on the evaluation value and the result of judgment on whether the user-specified position is contained in the face region or not. For example, in the case where the position of a color desired to be remained is contained in the face region, range specifying unit 24C may set the hue range corresponding to a skin color previously stored in flash memory 27 as the hue range of the color desired to be remained. On the other hand, in the case where the position of a color desired to be remained is not contained in the face region, range specifying unit 24C may select a hue range based on the evaluation value from among a plurality of hues previously stored in flash memory 27 and set the hue range as the hue range of the color desired to be remained. Also in that case, the hue range corresponding to a skin color is set wider in the case where the position of the color desired to be remained is contained in the face region than a plurality of hue ranges in the case where the position of the color desired to be remained is not contained in the face region. Range specifying unit 24C may be configured to have the table for determining a color desired to be remained in a form other than a hue table. For example, range specifying unit 24C may be configured to have the table of colors desired to be remained in a form of color information represented by RGB color space.

The embodiment has been provided by the accompanying drawings and the detailed description as described above. The present inventor provides the accompanying drawings and the detailed description to exemplify the subject matter defined in the claims with reference to a particular embodiment for those skilled in the art. Therefore, the constituent elements illustrated in the accompanying drawings and described in the detailed description may include not only a constituent element which is necessary to solve the problem but also a constituent element which is not necessary to solve the problem. Accordingly, it should not be instantly understood that the unnecessary constituent element is necessary only because the unnecessary constituent element is illustrated in the accompanying drawings or discussed in the detailed description. Further, various changes, substitutions, addition and/or omission and the like may be performed on the embodiment within the scope of the claims and the equivalent of the claims.

Since color conversion processing nearer to the user's intention becomes available according to the present technique, the technique can be also applied to a digital still camera, a digital video camera, a mobile phone, a smart phone, a mobile PC, and the like.

What is claimed is:

1. An image processing apparatus comprising:
   a face detection unit configured to detect a face region which is determined as a face in an image;
   a position specifying unit configured to specify a particular position in the image in response to user operation;
   a range specifying unit configured to set a hue range which has a first range containing a hue at a position specified by the position specifying unit in a case where the position is not contained in the face region and to set a hue range which has a second range containing a hue at a position specified by the position specifying unit and wider than the first range in a case where the position specified by the position specifying unit is contained in the face region; and
   an image processing unit configured to perform image conversion processing based on color information contained in the hue range set by the range specifying unit.

2. The image processing apparatus according to claim 1, wherein the image processing unit is configured to take color information contained in the hue range at the position specified by the position specifying unit as standard color information and perform image conversion processing for changing color information of a particular region of the image, the particular region of the image having color information which is not contained in the standard color information.

3. The image processing apparatus according to claim 1, wherein the image processing unit is configured to take color information contained in the hue range at the position specified by the position specifying unit as standard color information and perform image conversion processing for achromatizing a particular region of the image, the particular region of the image having color information which is not contained in the standard color information.

4. An image processing method comprising:
   detecting a face region which is determined as a face in an image;
   specifying a particular position in the image in response to user operation;
   setting a hue range which has a first range containing a hue at a position specified by the user operation in a case where the position specified by user operation is not contained in the face region and setting a hue range which has a second range containing a hue at a position specified by user operation and wider than the first range in a case where the position specified by user operation is contained in the face region; and performing image conversion processing based on color information contained in the hue range.

5. The image processing method according to claim 4, further comprising:

performing image conversion processing for changing color information of a particular region of the image, the particular region of the image having color information which is not contained in a standard color information, the standard color information being color information contained in the hue range at the position specified by user operation.

6. The image processing method according to claim 4, further comprising:

performing image conversion processing for achromatizing a particular region of the image, the particular region of the image having color information which is not contained in the standard color information, the standard color information being color information contained in the hue range at the position specified by user operation.

7. An imaging apparatus comprising:

an imaging unit for capturing a subject image;

a data recording unit for recording image data generated based on the subject image captured by the imaging unit;

a display unit for displaying an image based on the image data recorded in the data recording unit; and an image processing apparatus configured to perform image processing on the image displayed on the display unit, wherein the image processing apparatus comprises:

a controller unit configured to set a hue range which has a first range containing a hue at a position specified by user operation in a case where a particular position in the image specified by user operation is not contained in a face region of the image and to set a hue range which has a second range containing a hue at a position specified by user operation and wider than the first range in a case where a particular position in the image specified by user operation is contained in the face region; and an image processing unit configured to perform image conversion processing based on color information contained in the hue range set by the controller unit.

8. The imaging apparatus according to claim 7, wherein the image processing unit is configured to take color information contained in the hue range at the position specified by user operation as standard color information and perform image conversion processing for changing color information of a particular region of the image, the particular region of the image having color information which is not contained in the standard color information.

9. The imaging apparatus according to claim 7, wherein the image processing unit is configured to take color information contained in the hue range at the position specified by user operation as standard color information and perform image conversion processing for achromatizing a particular region of the image, the particular region of the image having color information which is not contained in the standard color information.

* * * * *